United States Patent
Morin et al.

(10) Patent No.: US 7,975,882 B2
(45) Date of Patent: Jul. 12, 2011

(54) DISPENSER OF POWDERED PRODUCT HAVING A REMOVABLE RESERVOIR

(75) Inventors: Gilles Morin, Sainte Honorine du Fay (FR); Séverine Miu, Mayenne (FR)

(73) Assignee: SEB S. A., Ecully (FR)

( * ) Notice: Subject to any disclaimer, the term of this patent is extended or adjusted under 35 U.S.C. 154(b) by 1061 days.

(21) Appl. No.: 11/763,737

(22) Filed: Jun. 15, 2007

(65) Prior Publication Data
US 2007/0290003 A1    Dec. 20, 2007

(30) Foreign Application Priority Data

Jun. 15, 2006 (FR) ...................................... 06 05346

(51) Int. Cl.
*B65D 47/06* (2006.01)
(52) U.S. Cl. ...................... 222/325; 222/185.1; 222/370; 222/516; 222/548; 141/346; 141/352; 141/354; 141/364; 141/386
(58) Field of Classification Search ............... 222/185.1, 222/325, 368, 370, 284, 375, 383, 384, 386; 141/346, 351–355, 363–366, 167, 168, 168.5, 141/516, 548–549
See application file for complete search history.

(56) References Cited

U.S. PATENT DOCUMENTS

| | | | |
|---|---|---|---|
| 2,138,204 A | | 11/1938 | Rable |
| 3,123,107 A | * | 3/1964 | Kappler ......................... 141/352 |
| 5,224,527 A | * | 7/1993 | McCunn et al. .............. 141/346 |
| 6,626,085 B1 | | 9/2003 | Lassota |
| 7,441,495 B2 | * | 10/2008 | Halle et al. ...................... 99/295 |
| 2004/0169051 A1 | * | 9/2004 | Ufheil et al. ................... 222/129 |
| 2004/0173101 A1 | * | 9/2004 | Steckhan ........................ 99/275 |

FOREIGN PATENT DOCUMENTS

| | | |
|---|---|---|
| WO | 02081308 | 10/2004 |
| WO | 2004098361 | 11/2004 |
| WO | 2004098361 A1 | 11/2004 |

* cited by examiner

*Primary Examiner* — J. Casimer Jacyna
(74) *Attorney, Agent, or Firm* — Browdy and Neimark, PLLC

(57) ABSTRACT

A dispenser of a product in powder from, composed of: a case delimiting a housing; a reservoir removably installed in the housing, the reservoir being adapted to contain the product in powder form and having a dispensing orifice; and a device for obturating the dispensing orifice. The device has a blocking member in the form of a shutter mounted to the reservoir for movement between a position for closing the dispensing orifice and a position for opening the dispensing orifice. The housing, the reservoir and the device are constructed to enable the reservoir to be installed in the housing by a vertical linear movement and to cause automatic movement of the shutter from the position for closing to the position for opening in response to the vertical linear movement of the reservoir into the housing.

14 Claims, 4 Drawing Sheets

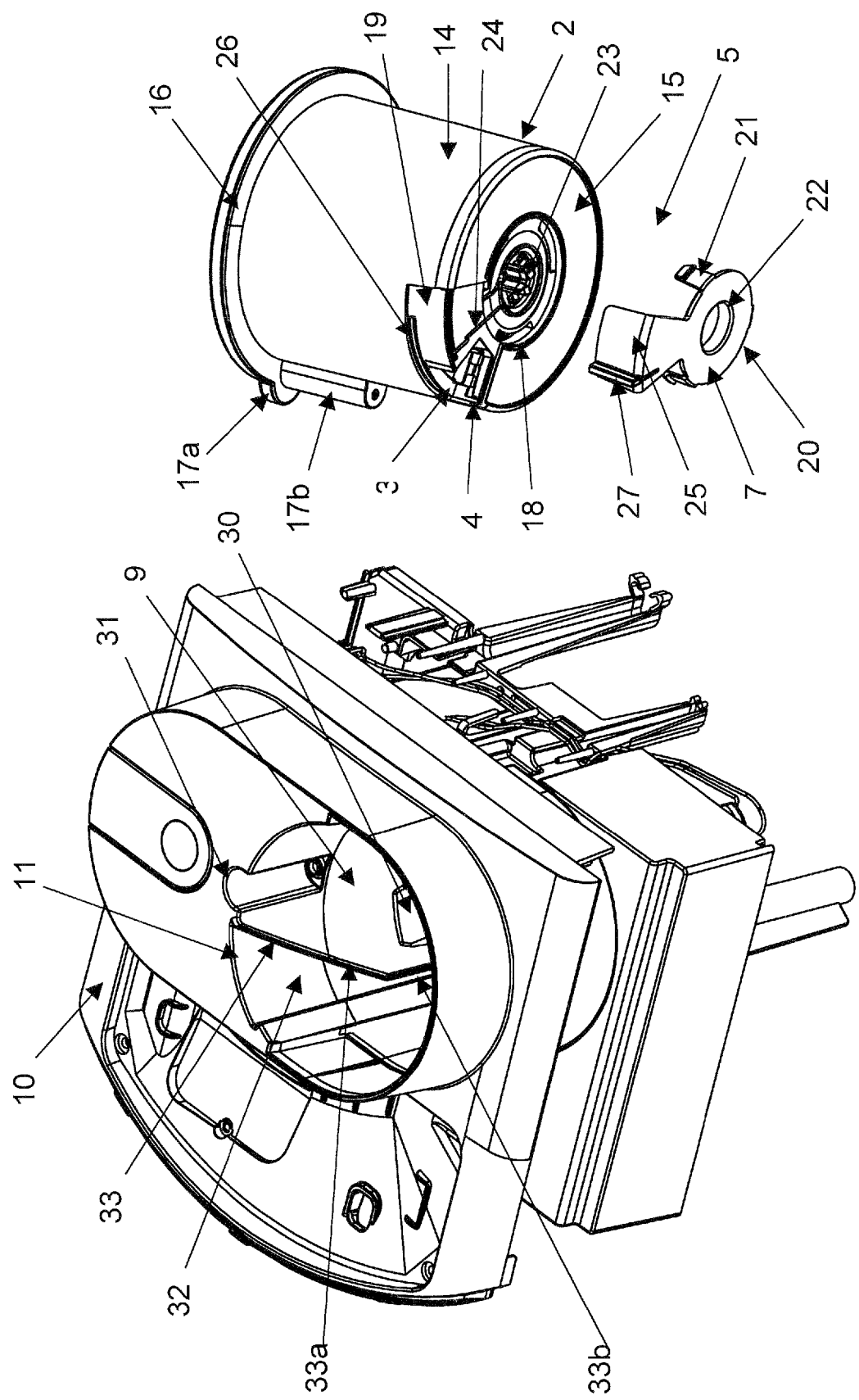

DISPENSER OF POWDERED PRODUCT HAVING A REMOVABLE RESERVOIR

BACKGROUND OF THE INVENTION

The present invention relates to a dispenser device for powdered product comprising a removable reservoir for storing a product in pulverulent, powder, ground, or granular form, which will be referred to herein as powder form or a powdered product, such as ground coffee, tea, chocolate, etc., for preparation of a brewed, or infused, beverage, the product being adapted to be used with an appliance for preparation and distribution of such beverages.

An appliance for preparation and distribution of hot beverages, for example starting from ground coffee, generally comprises a cold water reservoir, an electric pump, a boiler and a brewing, or infusion, head providing a chamber adapted to receive a certain quantity of ground coffee in order to inject therein a predetermined quantity of hot water coming from the boiler, the resulting beverage being then directed towards a collecting container, such as a cup or carafe. At the end of the brewing cycle, the brewing head must be opened in order to be able to introduce a new ground coffee dose after having evacuated the grounds previously brewed. The ground coffee is conveyed to the brewing chamber from a dispenser of the product in powder form. These appliances require a regular filling of the reservoir of the dispenser, an operation that requires time and much of attention by the user, especially when access to the reservoir is in a small space.

To mitigate these disadvantages, certain appliances have removable reservoirs. U.S. Pat. No. 2,138,204 describes such an appliance, in particular a coffee mill with a removable coffee bean reservoir. The reservoir has, in its lower part, a distribution opening adapted to be sealed by a sliding plate. The plate is maintained in position by a spring and can slide, between its open and closed positions, while being actuated, from outside of the machine, by a control lever. Such an appliance presents the disadvantage of requiring the user to perform a manual actuation.

An improved solution is described in U.S. Pat. No. 6,626,085 relating to coffee grinder having two removable reservoirs each provided with an automatic closure of its dispensing orifice. In particular, the dispensing orifice of each reservoir is closed automatically by a sliding trap door pushed by a return spring, opening occurring when the user presses on a control knob of a solenoid, which pushes the same sliding plate into its open position, against the return spring. This grinder is provided, certainly, of an automatic closing device for the dispensing of coffee beans in the direction of a grinding chamber, but this opening is controlled by the user.

A similar solution is described in the patent document WO2004/098361, where the opening or the closing of a sliding door sealing an orifice of the removable reservoir is controlled by a solenoid or magnets. However, the installation of the reservoir is effected by a horizontal sliding motion, which implies the presence of guide rails over a long length inside the machine, while rendering the handling of such reservoirs of elongated form and lateral handle difficult for the user.

Another solution is described in the French patent document FR 2 713 906 relating to a grounds dispenser for an automatic coffee machine comprising a grounds reservoir positioned in a removable manner in a corresponding seat formed in the case, or housing, of the machine. The grounds reservoir comprises proportioning, or dosing, blades rotated by an electric motor in the housing, the dispensing orifice being closed by halting of the blades in a given position, which blades have dimensions correspond to those of the dispensing orifice that the blades border. Functioning satisfactorily, this solution proves however to be of a rather complex construction.

The German document DE 203 00 928 U1 describes another solution for a removable coffee bean reservoir for a coffee machine comprising a central orifice closed by two shutters of arched form driven in rotation relative to one another when the reservoir is rotated around its vertical axis inside the machine. However, this solution presents the disadvantage of being useable only with coffee beans having dimensions greater than that of the opening existing between the two shutters when they are in their closing position. In addition, it proves not only to be of complex construction, but also to be complicated to operate by the user, who must then rotate the reservoir himself, while carrying out several phases of rotation, each one corresponding to a specific function: installation of the reservoir, then several possibilities of opening of the shutters, then closing while turn it in the other directions, etc.

BRIEF SUMMARY OF INVENTION

The invention overcomes the above-mentioned disadvantages and provides a dispenser of product in powder form with a removable reservoir that makes it possible for the user to easily install the reservoir with respect to the dispenser and to withdraw it, and this in full safety in an easy and intuitive way, providing a constructive solution that is simplified and reliable in operation.

The invention further provides a powdered product dispenser with a removable reservoir comprising a dispensing orifice adapted to be opened and closed automatically.

The invention further provides a powdered product dispenser with a removable reservoir comprising an automatic system for closing of its dispensing orifice that is of simplified construction, easy to manufacture on an industrial scale at less cost, while being reliable in operation.

More specifically, the invention provides a powdered product dispenser comprising a case, a removable reservoir installed in a housing formed in the case, the reservoir containing the product in powder form and having a dispensing orifice, as well as a device for obturating, or blocking, this orifice, which device comprises at least one blocking device in the form of a shutter carried by the reservoir and mounted for movement between a position for closing of the dispensing orifice and a position for opening this orifice, owing to the fact that the installation by vertical translation of the reservoir into the housing of the case initiates displacement of the shutter from its closing position to its open position.

Such a dispenser of product in powder form is preferably used with a machine for preparing beverages, the product in powder form being able to be coffee beans or ground coffee, tea, chocolate, etc. The dispenser comprises a reservoir for the product in powder form provided with a dispensing orifice and a device for obturating this orifice, the reservoir permitting, due to its removability, an easy changeover from one type of product in powder form to another, by a simple exchange of reservoirs. The reservoir being removable, the dispensing orifice, or outlet, of the reservoir is maintained closed when the reservoir is outside the dispenser, thus making it possible to avoid the risks of loss of product in powder form during removal from the dispenser and handling of the reservoir containing the product.

According to the invention, the obturating device for the dispensing orifice cooperates with actuation means that permit the shutter for the dispenser to pass automatically from a closed position, when the reservoir is out of the case, to an open position, when the reservoir is positioned in its housing within the dispenser. More particularly according to the invention, opening of the dispensing orifice occurs automatically at the same time as the installation of the reservoir by a vertical translatory movement into its housing provided for this purpose in the case of the dispenser, a case that can be, for example, connected to a case or housing of a machine for preparation of beverages. Thus, at the end of its path of descent into its housing, by a vertical translatory, or straight-line movement, the reservoir will already have come into its operating position.

The installation of the reservoir inside its housing is done advantageously by a downward vertical straight-line movement, this already requiring a reduced effort on the part of the user, the reservoir taking its place naturally, by simple descent into the housing under the effect of its weight.

Thus, the user, has only to correctly position the reservoir relative to the opening at the top of its housing inside the case of the machine, then to simply let it slide vertically inside this housing, where it comes to be seated under the effect of its own weight. There is thus no longer the need for the user to have to handle the reservoir or its components after the end of its path of descent into the housing of the machine, nor to have to control by a lever or control knob the opening of the dispensing orifice of the reservoir, this being guaranteed by the simple setting in position by vertical movement of the reservoir into its housing. This clearly simplifies the construction of the dispenser and its reservoir and especially the operation of installation and removal of the reservoir with respect to the machine, an operation that then proves to be very intuitive. In addition, one thus avoids any risk of handling or wrong movement by the user, in particular possibly forgetting to effect an opening movement, which could then cause malfunction of the dispenser or machine containing it.

Advantageously, the shutter is actuated towards its closing position by a return spring when the reservoir is withdrawn from the housing.

This solution makes it possible to automatically close the orifice for delivery of the product from the reservoir during its withdrawal from the housing and to maintain the reservoir containing the product in powder form closed during its transport or storage outside the dispenser, while being simple to implement.

Preferably, the housing of the case comprises a cam cooperating with the periphery of the shutter.

One could, certainly, have considered a solution of remote sensing of the correct installation of the reservoir in its housing, for example by using an optical sensor and an electronic circuit for receiving the signal from the sensor to actuate a mechanism for driving the shutter. However the present solution using mechanical means is preferred because such means are simple to implement and less expensive than the preceding, while being reliable in operation.

Advantageously, the shutter comprises a rib engaging in a slit formed in a wall of the housing.

This allows a direct actuation of the shutter at the time of the installation of the reservoir in its housing, as well as an easy installation of the reservoir in its housing, the slit formed in the wall of the housing being at the same time easily locatable from the upper part, or top, of the housing and being able, moreover, to present in this same upper part, a chamfer for introduction of the rib of the shutter.

Advantageously, the translatory movement of the reservoir in the housing of the case initiates rotational displacement of the shutter.

One could, certainly, have considered the use of a sliding shutter obturating device moved in translation by the cam of the housing. However a swiveling, or pivoting, shutter construction is preferred because it is more compact and easier to implement.

Preferably, the shutter is mounted to rotate at the bottom of the reservoir, while being brought to rotate about the longitudinal axis of the reservoir.

Such a shutter assembled at the bottom of the reservoir makes it possible to completely evacuate its contents. In addition, such a shutter rotating about the longitudinal axis of the reservoir can advantageously be used with a reservoir of generally cylindrical form.

Advantageously, the dispensing orifice is a window formed in a cylindrical side wall of the reservoir and being prolonged on a bottom wall of the reservoir.

Such a dispensing orifice formed in the lower part of a side wall of the reservoir and being prolonged on the bottom wall of the reservoir makes it possible to distribute a large volume of product for a small displacement of the shutter, in particular a small pivot angle of the shutter.

Preferably, the shutter pivots at the outside the reservoir and has a guide pin displaceable in a groove of the reservoir.

The pivoting of the shutter outside the reservoir ensures a very good closing of the dispensing orifice associated with an easy assembly of the shutter with respect to the reservoir.

Advantageously, the shutter is made so as to ensure an air-tight closing of the reservoir.

The walls of the shutter have a form and dimensions corresponding to those of the dispensing orifice and the shutter is assembled with respect to the reservoir with a very small play, so as to ensure an air-tight closing of the reservoir, to thus prevent the oxidation of the product contained in the reservoir and its conservation outside the dispenser.

Preferably, the reservoir has indexing means for indicating a position with respect to the housing of the case.

This facilitates the installation of the reservoir in its housing and guarantees at the same time the correct positioning of the reservoir, which is a condition necessary for the correct operation of the obturating device of the shutter.

In an alternative embodiment of the invention, the reservoir contains ground coffee and the dispenser has dosing means making it possible to deliver measured quantities of ground coffee.

In another alternative embodiment of the invention, the reservoir contains coffee beans and the coffee machine has means for grinding or milling the beans and for delivery of the grounds.

The dispenser with removable reservoir according to the invention can thus be employed with reservoirs containing ground coffee or beans, and therefore with different types of machines.

The dispenser with removable reservoir according to the invention advantageously finds its application in automatic machine for preparation of beverages. Such an automatic machine includes means for supplying a predetermined quantity of liquid, typically water, into a brewing chamber that has been supplied with a quantity of brewing product in powder form delivered from the dispenser according to the invention, as well as means allowing evacuation of the brewing product out the brewing chamber, after brewing, toward a collecting container. The dispenser with removable reservoir according to the invention makes it possible to open and close the outlet orifice for the brewing product in powder form without intervention by the user, to avoid the risks of loss of stored product or soiling during withdrawal of the reservoir, and to better preserve the taste and aroma of the product during storage outside the machine, while making it possible for the machine to produce several types of beverages from brewing products supplied by interchangeable, removable reservoirs.

BRIEF DESCRIPTION OF THE DRAWING

The invention will be better understood from a study of one embodiment provided on a purely non-limiting and non-restrictive basis and illustrated in the annexed figures in which:

FIG. 1a is an exploded bottom perspective view of a removable reservoir of the dispenser of the invention;

FIG. 1b is a perspective view of a unit forming a case for receiving the dispenser;

DETAILED DESCRIPTION OF THE INVENTION

Figure 3:
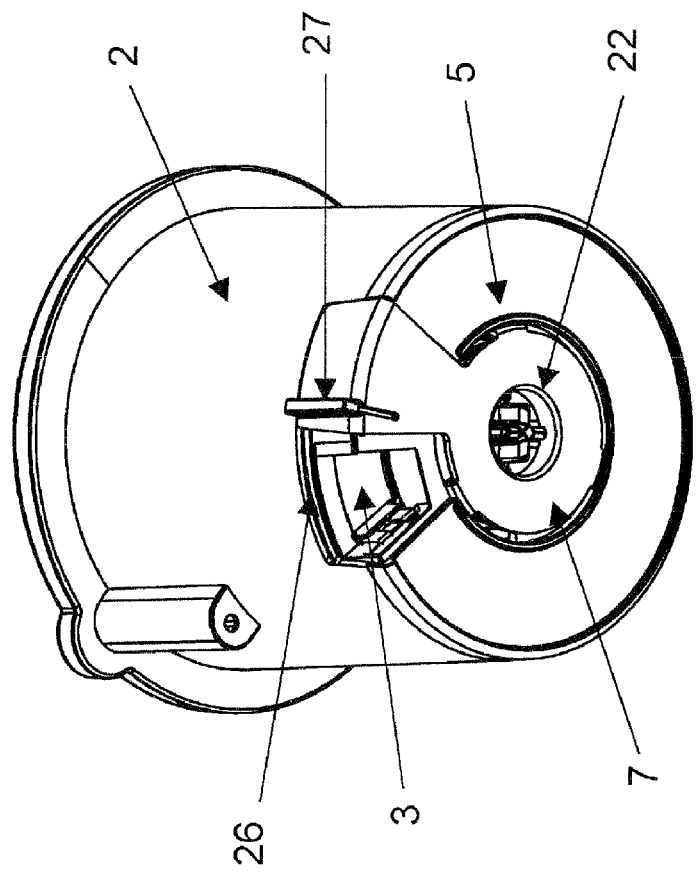
FIGS. 2 and 3 are bottom perspective views of the removable reservoir of FIG. 1a, showing the dispensing orifice closed and open, respectively.

A dispenser of product in powder form will be described within the framework of an automatic coffee machine, the distributed product in powder form being in this case ground coffee. A coffee machine containing a dispenser of product in powder form according to the invention comprises elements that are already known for this type of machine and can incorporate the details described in the international patent document WO 9912457, the disclosure of which is incorporated herein by reference, insofar as concerns the device for tamping coffee grounds in the brewing chamber and for ejection of used coffee grounds, such as "pucks" formed in espresso machines. Such a machine is in particular adapted to ensure an adequate temperature of the water delivered into the brewing chamber and to carry out the compaction of the ground coffee inside the brewing chamber. The coffee obtained after brewing of the coffee in the brewing chamber is conveyed outside the machine into a collecting container, such as for example described in the international patent document WO 9912456, the disclosure of which is incorporated herein by reference.

The dispenser of product in powder form described comprises moreover dosing means, in particular a hub rotating dosing blades, making it possible to deliver defined quantities of ground coffee, these means comprising known elements and being able to incorporate the details described in the French patent document FR 2 713 906, the disclosure of which is incorporated herein by reference.

Referring to FIGS. 1a and 1b, the ground coffee dispenser comprises a reservoir 2 of generally cylindrical form, the dispenser having a dispensing orifice 3 in its lower part and a closing device 5 that includes a shutter 7 for closing, and preferably sealing, orifice 3.

Reservoir 2 has a side wall 14 of generally cylindrical form, a bottom wall 15 and an upper, or top, edge 16 adapted to receive a removable lid (not shown). As shown, edge 16 has an outwardly protruding rim, or flange. A protuberance 17a is formed on a side of upper edge 16 and is prolonged downwardly by a semi-cylindrical protuberance 17b protruding radially outwardly from side wall 14 of reservoir 2. Protuberance 17b forms indexing, or positioning, means for properly orienting reservoir 2 when it is being installed in a housing envisaged to this end in the coffee machine, such as will be described hereafter. To facilitate the assembly of the different components of the reservoir, bottom wall 15 is made as a separate part nested in side wall 14 and has a central opening 18.

Dispensing orifice 3 is provided on one side of reservoir 2, and appears in the form of a corner window 4 that has a rectangular form in the lower part of side wall 14 and is prolonged inwardly from side wall 14 by an opening in the form of a sector of a circle subtending an angle of approximately 30° in bottom wall 15. To one side of dispensing orifice 3 there is provided a recess, or cutout 19, of the same width as that of dispensing orifice 3, while being formed to a small thickness in the external surface of reservoir 2 and making it possible to house shutter 7, as will be explained hereafter. A groove 26 borders the upper edge of recess 19, while being parallel to the bottom wall 15, and is prolonged above dispensing orifice 3.

Shutter 7 has a base 20 of generally circular form with an outer diameter corresponding to that of central opening 18. Shutter 7 is fixed at the bottom wall 15 of reservoir 2 by means of assembly tabs, or lugs, 21, housings for lugs 21 being provided in bottom wall 15 to allow rotation of shutter 7 around the vertical axis of reservoir 2 passing through the center of opening 18. An opening 22 in the center of base 20 of the shutter allows the passage of a shaft (not shown) for driving in rotation, from the case of the machine, of a hub 23 carrying dosing blades 40 (FIG. 5) inside the dispenser. Base 20 of the shutter is prolonged radially on one side by a closing member, plate, or door, 25 having an L-shaped form in a vertical plane, the form corresponding to, but the dimensions being slightly larger than, those of window 4 of reservoir 2, which is to be covered by plate 25. The vertical side wall of member 25 presents a vertical, outwardly protruding rib 27 of constant thickness over the entire height of this side wall of member 25.

Shutter 7 is mounted to be elastically movable relative to reservoir 2, under the action of a return torsion spring 24 (FIG. 1a), the spring being located between bottom wall 15 of reservoir 2 and base 20 of shutter 7. More particularly, return spring 24 has the general form of a concentric loop at the center of opening 18, with one of its ends being fixed at the bottom wall 15 and the other end being in the form of a radially projecting leg fixed to base 20 of shutter 7. In its rest position, return spring 24 ensures the maintenance in of shutter 7 in its position for closing dispensing orifice 3, window 4 preferably being closed in an airtight way by member 25.

Reservoir 2 is removably installed in a housing 9 of a case 10 of the dispenser of the coffee machine, which case is supported by the upper part of the frame of the machine and is shown in FIG. 1b. FIG. 1b shows an outlet opening 30 located at the bottom of housing 9 communicating, in a conventional manner via a chute, with the brewing chamber (not shown) and allowing, after the installation of reservoir 2 in housing 9, the flow of the ground coffee toward the brewing chamber of the machine. The part of outlet opening visible in FIG. 1b is in the side wall of housing 9. Housing 9 presents, along its side wall, a notch 31 for receiving protuberance 17b of reservoir 2 to allow an accurate yet rapid positioning of reservoir 2 relative to housing 9 and to prevent any rotation of reservoir 2 relative to housing 9.

According to the invention, the installation by vertical translational, or linear, displacement of reservoir 2 into housing 9 starts the rotational movement of shutter 7 around the longitudinal, or vertical, axis of the reservoir. More particularly, housing 9 comprises a cam 32 that cooperates with the periphery of shutter 7 as the reservoir is being inserted into housing 9 of case 10. More particularly, an opening, or recess, or slot, 33 is formed in the internal side wall 11 of housing 9 and presents a first, oblique, edge 33a prolonged towards the bottom of housing 9 by a vertical edge 33b, edges 33a and 33b forming camming surfaces. Recess 33 is located relative to notch 31 so as to receive rib 27 of shutter 7 of reservoir 2 when the latter is introduced into housing 9, shutter 7 initially being in its closing position. During the introduction of reservoir 2 into housing 9, rib 27 of shutter 7 comes to bear first against edge 33a of recess 33 forming a camming ramp that pushes shutter 7 in a pivoting movement in opposition to the restoring force of return spring 24 during the vertical descent of reservoir 2 in housing 9. The pivoting movement of shutter 7 is guided by an internal lug 35, carried by shutter 7 (FIG. 4) and sliding in groove 26 of reservoir 2, return spring 24 maintaining rib 27 in contact with the edges of recess 33.

Figure 4:
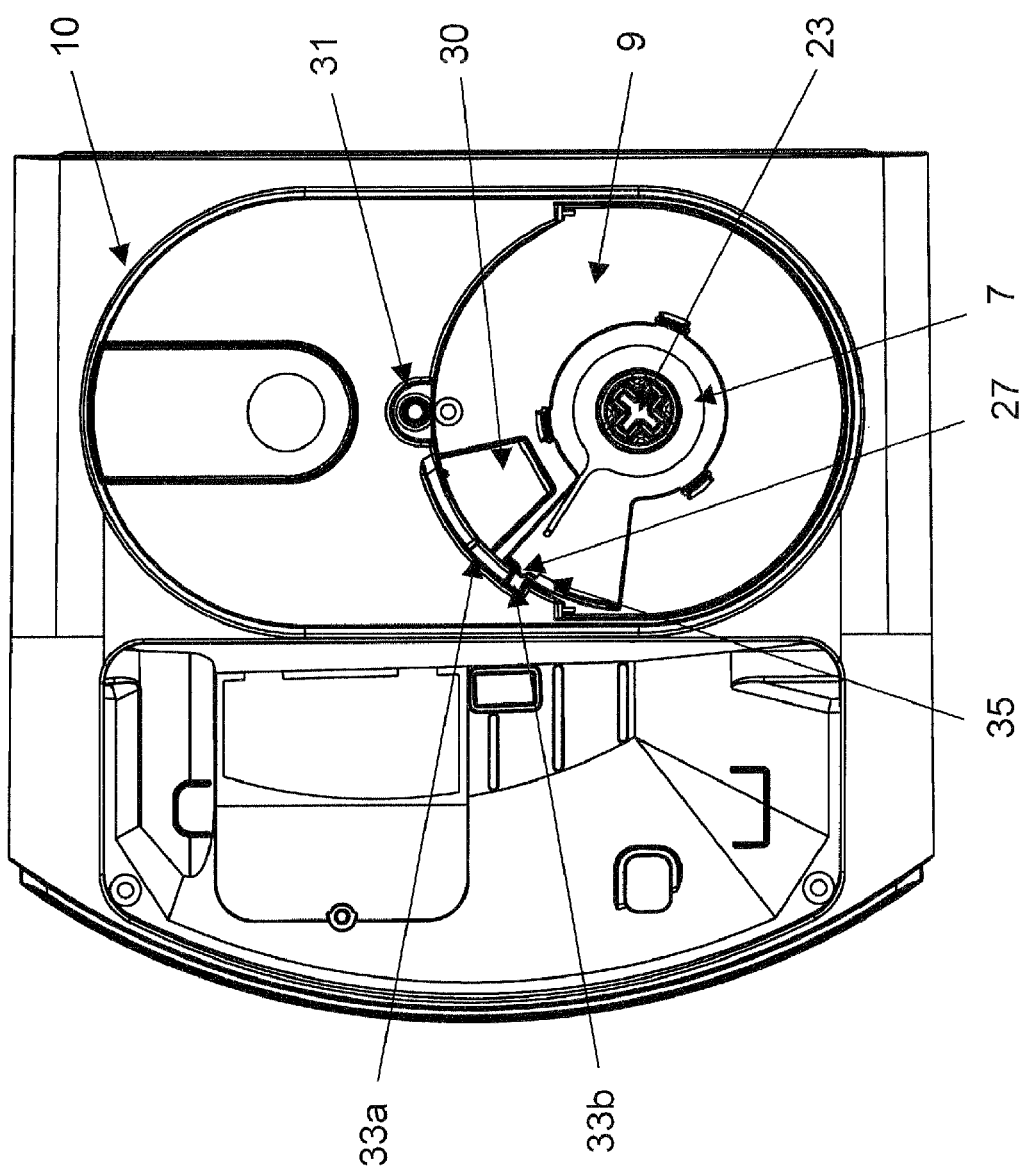
FIG. 4 is a top plan view of the dispenser assembled in the case of the FIG. 1b, the reservoir being removed to permit viewing of the dispenser.

FIG. 4 shows a top view of case 10 of the dispenser assembled in a coffee machine, the reservoir being removed to permit illustration of the dispenser components. When the reservoir of the dispenser is in its fully installed position in housing 9 within the coffee machine, rib 27 of shutter 7 is on the level of the vertical edge 33b of recess 33, and shutter 7 is pivoted to shift closing member 25 into a position covering recess 19 of the reservoir, leaving dispensing orifice 3 completely open. When the dispense is in the fully installed position, dispensing orifice is located in line with, or directly opposite, outlet opening 30, thus allowing coffee to flow toward the brewing chamber.

Figure 2:
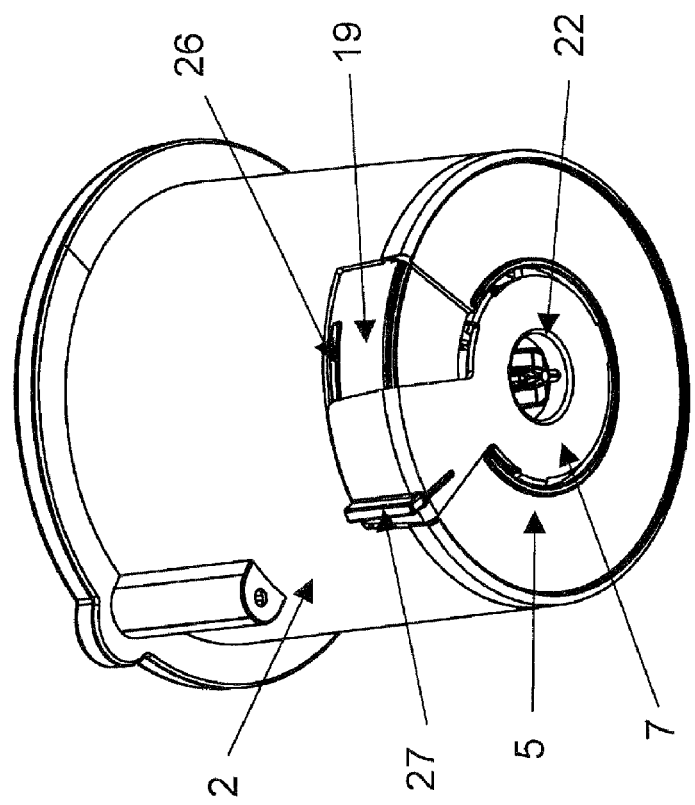

FIGS. 2 and 3 show reservoir 2 with closing device 5 in the two extreme positions of operation. Thus, FIG. 2 shows reservoir 2 when it is withdrawn from the coffee machine, with shutter 7 completely closing the dispensing orifice, leaving recess 19 completion uncovered. Reservoir 2 is thus ready for transport or storage. FIG. 3 shows reservoir 2 in its position of operation within the coffee machine. In contrast to the state shown in FIG. 2, shutter 7 has been shifted towards the right, while superimposing itself on recess 19 to completely open dispensing orifice 3.

Figure 5:
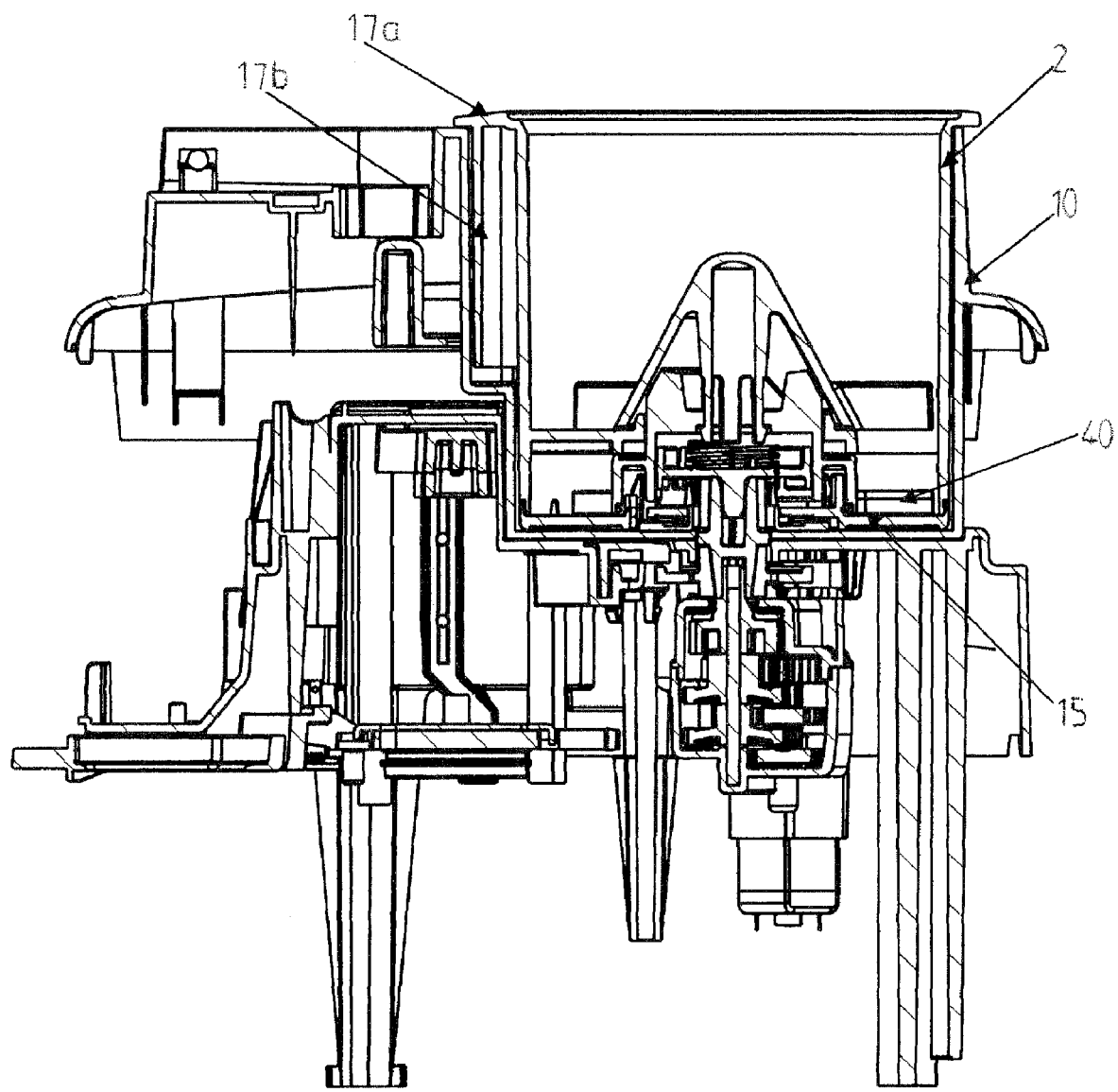
FIG. 5 is an elevational, cross-sectional view showing the case of FIG. 1b with the reservoir of FIGS. 1a, 2 and 3 installed.

FIG. 5 shows reservoir 2 installed in the housing in case 10 along with dosing means. The dosing means include rotating dosing blades 40 mounted in reservoir 2 just above bottom wall 15. Blades 40 are mounted to rotate around a vertical axis and are connected to be rotated in a conventional manner by a motor and gear train situated below reservoir 2.

In operation, the user starts by choosing the desired ground coffee, then fills, if necessary, a reservoir 2, and then positions the reservoir in housing 9 of case 10 of the dispenser. During the introduction of reservoir 2 into housing 9, rib 27 of shutter 7 comes in contact the edge 33a of recess 33 of cam 32 and slides therealong to pivot shutter 7 to the open position. Thus, dispensing orifice 3 is opened to communicate with the outlet opening 30 at the bottom of housing 9. At this time, the machine being ready to operate, the user can initiate a brewing cycle. Initiation of a brewing cycle places the dosing blades of the dispenser into motion, in the manner already known in the art, causing a measured amount of ground coffee to be delivered through orifice 3 and outlet opening 30 to the brewing chamber. A tamping piston compresses the grounds and a predetermined quantity of hot water is sent from the boiler into the brewing chamber, and the beverage obtained by passage of the water through the grounds is delivered outside the machine. The brewing cycle finished, the user can withdraw removable reservoir 2 from the machine, during which withdrawal the return spring 24 of shutter 7 acts to automatically close dispensing orifice 3.

Other alternatives and modes of realization of the invention can be considered without leaving the framework of its claims.

Thus, one can use any other type of mobile shutter associated with reservoirs of various forms, such as a sliding shutter on a flat wall of a parallelepipedic reservoir, or on a bottom wall of the reservoir, etc.

In the same manner, one could replace the actuation cam of the shutter by a mechanism, for example, with hinged arms adapted to couple a part of the shutter and to displace it during the introduction of the reservoir into the machine.

This application relates to subject matter disclosed in French Application number FR 06 05346, filed on Jun. 15, 2006, the disclosure of which is incorporated herein by reference.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

Thus the expressions "means to . . . " and "means for . . . ", or any method step language, as may be found in the specification above and/or in the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same functions can be used; and it is intended that such expressions be given their broadest interpretation.

What is claimed is:

1. A dispenser of a product in powder form, comprising:
   a case delimiting a housing;
   a reservoir removably installed in said housing, said reservoir being adapted to contain the product in powder form and having a dispensing orifice; and
   a device for obturating said dispensing orifice, wherein said device comprises at least one blocking member in the form of a shutter mounted to said reservoir for automatic pivotal movement between a position for closing said dispensing orifice and a position for opening said dispensing orifice, and
   wherein said housing, said reservoir and said device are constructed to enable said reservoir to be installed in said housing by a vertical linear movement and to cause automatic movement of said shutter from the position for closing to the position for opening in response to the vertical linear movement of said reservoir into said housing
   wherein said shutter is mounted at the bottom of said reservoir for only pivotal movement about the longitudinal axis of said reservoir.

2. The dispenser according to claim 1, wherein said device further comprises a spring connected for urging said shutter toward the position for closing when said reservoir is withdrawn from said housing.

3. The dispenser according to claim 2, wherein said housing of said case comprises a camming member cooperating with said shutter.

4. The dispenser according to claim 3, wherein said shutter comprises a rib engaging with said camming member to cause the automatic movement of said shutter.

5. The dispenser according to claim 1, wherein the start of vertical linear movement to install said reservoir acts to start the automatic pivotal movement of said shutter.

6. The dispenser according to claim 1, wherein said reservoir has a cylindrical side wall and a bottom, and said dispensing orifice is a window disposed partially in said cylindrical side wall of said reservoir and partially in said bottom wall of said reservoir.

7. The dispenser according to claim 6, wherein said shutter is mounted to undergo pivotal movement outside said reservoir and comprises a pin guided in a groove provided in said reservoir to guide the pivotal movement of said shutter.

8. The dispenser according to claim 1, wherein said shutter is mounted to undergo pivotal movement outside said reservoir and comprises a pin guided in a groove provided in said reservoir to guide the pivotal movement of said shutter.

9. The dispenser according to claim 1, wherein said shutter constitutes means for forming an air-tight seal for said dispensing orifice when said shutter is in the position for closing said dispensing orifice.

10. The dispenser according to claim 1, wherein said reservoir has positioning means for assuring that said reservoir is in a defined position relative to said housing of said case.

11. The dispenser according to claim 1, wherein said reservoir is adapted to contain ground coffee and said dispenser comprises dosing means for delivering defined quantities of ground coffee.

12. The dispenser according to claim 1, wherein said housing of said case comprises a camming member cooperating with said shutter.

13. The dispenser according to claim 12, wherein said shutter comprises a rib engaging with said camming member to cause the automatic movement of said shutter.

14. An automatic machine for preparation of beverages, said machine comprising a dispenser of product in powder form according to claim 1.

* * * * *